(12) United States Patent
Lee et al.

(10) Patent No.: US 11,851,103 B2
(45) Date of Patent: Dec. 26, 2023

(54) INDEPENDENTLY DRIVING WHEEL MODULE AND MOUNTING METHOD THEREOF

(71) Applicant: HYUNDAI MOBIS CO., LTD., Seoul (KR)

(72) Inventors: Tae Heon Lee, Yongin-si (KR); Won Hyok Choi, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/093,040

(22) Filed: Jan. 4, 2023

(65) Prior Publication Data

US 2023/0143749 A1 May 11, 2023

Related U.S. Application Data

(63) Continuation of application No. 17/519,856, filed on Nov. 5, 2021, now Pat. No. 11,577,783.

(30) Foreign Application Priority Data

Nov. 17, 2020 (KR) ........................ 10-2020-0153702

(51) Int. Cl.
*B62D 17/00* (2006.01)
*B62D 7/16* (2006.01)
(Continued)

(52) U.S. Cl.
CPC ............... *B62D 17/00* (2013.01); *B62D 7/16* (2013.01); *B62D 7/18* (2013.01); *B60K 7/0007* (2013.01)

(58) Field of Classification Search
CPC ............. B62D 7/18; B62D 7/16; B62D 17/00
See application file for complete search history.

(56) References Cited

U.S. PATENT DOCUMENTS 4,418,938 A * 12/1983 Sullivan ................. B60G 15/07
280/86.753
5,826,894 A 10/1998 McDonald et al.
(Continued)

FOREIGN PATENT DOCUMENTS

CN 207141175 U 3/2018
DE 10 2016 209 590 A1 12/2017
(Continued)

OTHER PUBLICATIONS

WO 2020145166 A1 machine translation from espacenet.com (Year: 2023).*

(Continued)

*Primary Examiner* — Paul N Dickson
*Assistant Examiner* — Maxwell L Meshaka
(74) *Attorney, Agent, or Firm* — NSIP Law (57) ABSTRACT

An independently driving wheel module includes: a base frame including an upper end fixed to a coupling surface of a vehicle body, and a rotation part coupled to the upper end of the base frame such that the rotation part is rotatable with respect to the upper end of the base frame; a connection link including a first end integrally coupled to the rotation part, and a second end having a shape extending downward from the first end of the connection link; a driving wheel disposed at a side of the second end of the connection link and coupled to the second end of the connection link; and a rotation plate including an upper and lower surfaces extending obliquely in misaligned directions, the rotation plate being interposed between the base frame and the vehicle body so as to be rotatable with respect to the base frame or the vehicle body.

15 Claims, 8 Drawing Sheets

(51) Int. Cl.
   *B62D 7/18*   (2006.01)
   *B60K 7/00*   (2006.01)

(56) References Cited

U.S. PATENT DOCUMENTS

| | | | |
|---|---|---|---|
| 6,557,872 | B1 | 5/2003 | Garrard |
| 8,075,005 | B1 | 12/2011 | Ryshavy et al. |
| 8,820,759 | B1 | 9/2014 | Croutcher |
| 11,577,783 | B2 * | 2/2023 | Lee ................. B60G 3/207 |
| 2008/0303233 | A1 | 12/2008 | Dugandzic et al. |
| 2015/0054244 | A1 | 2/2015 | Seo et al. |
| 2017/0106893 | A1 | 4/2017 | Vidal et al. |
| 2020/0223478 | A1 | 7/2020 | Sano |
| 2020/0276877 | A1 | 9/2020 | Gao |
| 2020/0361532 | A1 | 11/2020 | Hoyer et al. |
| 2022/0055690 | A1 | 2/2022 | Itoh et al. |
| 2022/0105775 | A1 * | 4/2022 | Han ................. B60G 17/018 |
| 2022/0153348 | A1 * | 5/2022 | Lee ................. B60G 7/02 |
| 2022/0203823 | A1 * | 6/2022 | Choi ................. B62D 5/0418 |
| 2023/0085585 | A1 * | 3/2023 | Ryu ................. B60G 17/0162 |
| | | | 280/5.521 |

FOREIGN PATENT DOCUMENTS

| | | | | |
|---|---|---|---|---|
| DE | 102018128060 A1 | * | 5/2020 | |
| DE | 10 2019 106 839 A1 | | 9/2020 | |
| EP | 0 933 282 A1 | | 8/1999 | |
| EP | 3216677 A1 | * | 9/2017 | ............... B62D 5/04 |
| JP | 2002-211201 A | | 7/2002 | |
| KR | 20220129934 A | * | 9/2022 | |
| WO | WO 2011/147648 A1 | | 12/2011 | |
| WO | WO 2013/127471 A1 | | 9/2013 | |
| WO | WO-2016147067 A1 | * | 9/2016 | ........... B60B 35/003 |
| WO | WO 2019/185090 A1 | | 10/2019 | |
| WO | WO 2020/145166 A1 | | 7/2020 | |

OTHER PUBLICATIONS

Extended European Search Report dated Apr. 14, 2022 in counterpart European Patent Application No. 21207238.3.
Chinese Office Action dated Jun. 12, 2023, in counterpart Chinese Patent Application No. 202111361536.2 (5 pages in Chinese).

\* cited by examiner

INDEPENDENTLY DRIVING WHEEL MODULE AND MOUNTING METHOD THEREOF

CROSS REFERENCE TO RELATED APPLICATIONS

This application is a continuation of U.S. application Ser. No. 17/519,856 filed on Nov. 5, 2021, which claims the benefit under 35 U.S.C. § 119(a) of Korean Patent Application No. 10-2020-0153702 filed on Nov. 17, 2020 in the Korean Intellectual Property Office, the entire disclosures of which are incorporated herein by reference for all purposes.

BACKGROUND

Field

The present invention relates to an independently driving wheel module and a mounting method thereof and, more particularly, to a driving wheel module configured such that each driving wheel is provided with driving, brake, steering, and suspension devices.

Description of the Related Art

A new concept in which a driving wheel of a vehicle is modularized and separately mounted is being developed for purpose of improving the freedom of motion of the vehicle and securing battery space in an electric vehicle (EV), or achieving common use of a vehicle platform.

The new concept independently driving wheel module is assembled to the vehicle body while being provided with driving, brake, steering, and suspension devices and being modularized.

According to the independently driving wheel module separately assembled, various vehicle motions (for example, zero turning, crab steering, vertical-horizontal traveling, etc.) are possible during driving of a vehicle. A platform can be used in common use and simplified during vehicle development and production.

However, the independently driving wheel module according to the related art has a problem in that it is difficult to adjust deviation for dynamic geometry during assembly of the driving wheel module to a vehicle body.

The foregoing is intended merely to aid in the understanding of the background of the present invention, and is not intended to mean that the present invention falls within the purview of the related art that is already known to those skilled in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an independently driving wheel module includes: a base frame including an upper end fixed to a coupling surface of a vehicle body, and a rotation part coupled to the upper end of the base frame such that the rotation part is rotatable with respect to the upper end of the base frame; a connection link including a first end integrally coupled to the rotation part, and a second end having a shape extending downward from the first end of the connection link; a driving wheel disposed at a side of the second end of the connection link and coupled to the second end of the connection link; and a rotation plate including an upper surface and a lower surface extending obliquely in misaligned directions, the rotation plate being interposed between the base frame and the vehicle body so as to be rotatable with respect to the base frame or the vehicle body.

The rotation plate may be securely coupled to the base frame or the vehicle body such that the rotation plate is rotatable with respect to the base frame or the vehicle body.

The rotation plate may further include an elongated hole extending along a path in which the rotation plate is rotatable with respect to the base frame. The rotation plate may be coupled to the base frame or the vehicle body via the elongated hole.

The base frame may further include a coupling groove that is depressed downward or inward in the base frame. The rotation plate may be fixed by being locked and coupled to the coupling groove while being rotatably coupled to the base frame.

The upper surface of the rotation plate may extend parallel to the coupling surface of the vehicle body and the lower surface of the rotation plate may extend parallel to an upper surface of the base frame. The coupling surface of the vehicle body and the upper surface of the base frame may be inclined obliquely to each other.

A camber angle or a caster angle of the driving wheel may vary when the rotation plate is rotated with respect to the base frame or the vehicle body.

The driving wheel may include a knuckle coupled to the second end of the connection link and a hub rotatably coupled to the knuckle. The independently driving wheel module may further include a driving device fixed to the knuckle and operable to rotate the hub on the knuckle.

The driving wheel may include a knuckle coupled to the second end of the connection link and a hub rotatably coupled to the knuckle. The knuckle may be coupled to the second end of the connection link so as to allow relative movement of the knuckle in a vertical direction with respect to the connection link.

The independently driving wheel module may further include coupling links disposed to be vertically spaced apart from each other, the coupling links including respective first ends rotatably coupled to the second end of the connection link, and respective second ends rotatably coupled to the knuckle.

The independently driving wheel module may further include a suspension device including a first end coupled to the connection link and a second end connected to the driving wheel, the suspension device being configured to absorb vertical vibration of the driving wheel.

The independently driving wheel module may further include: a steering device including a first end securely coupled to the upper end of the base frame, the steering device being configured to rotate the rotation part or the connection link on the first end of the steering device as a center of rotation.

In another general aspect, a method of mounting an independently driving wheel module includes: interposing a rotation plate between a base frame and a vehicle body and fixing an upper end of the base frame to a coupling surface of the vehicle body, such that the rotation plate is rotatable with respect to the base frame or the vehicle body; rotating the rotation plate with respect to the base frame or the vehicle body; and securely coupling the rotation plate to the base frame or the vehicle body. The base frame includes a rotation part coupled to the upper end of the base frame such that the rotation part is rotatable with respect to the upper end of the base frame. The rotation plate includes an upper surface and a lower surface extending obliquely in misaligned directions. The independently driving wheel module comprises: the rotation plate; the base frame; a connection link including a first end integrally coupled to the rotation part, and a second end having a shape extending downward from the first end of the connection link; and a driving wheel disposed at a side of the second end of the connection link and coupled to the second end of the connection link.

The method may further include: after the interposing the rotation plate, primarily coupling the base frame to the vehicle body so as to prevent rotation of the base frame with respect to the vehicle body.

In the rotating of the rotation plate, the rotation plate may be rotated with respect to the base frame or the vehicle body so as to change a camber angle or a caster angle of the driving wheel.

The securely coupling of the rotation plate may include securely coupling the rotation plate to the base frame or the vehicle body by plastically deforming the rotation plate.

Other features and aspects will be apparent from the following detailed description, the drawings, and the claims.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification.

However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be construed in the same manner.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, preferred embodiments of the present invention will be described in detail with reference to accompanying drawings. Like reference numerals given in the drawings indicate like components.

Figure 1:
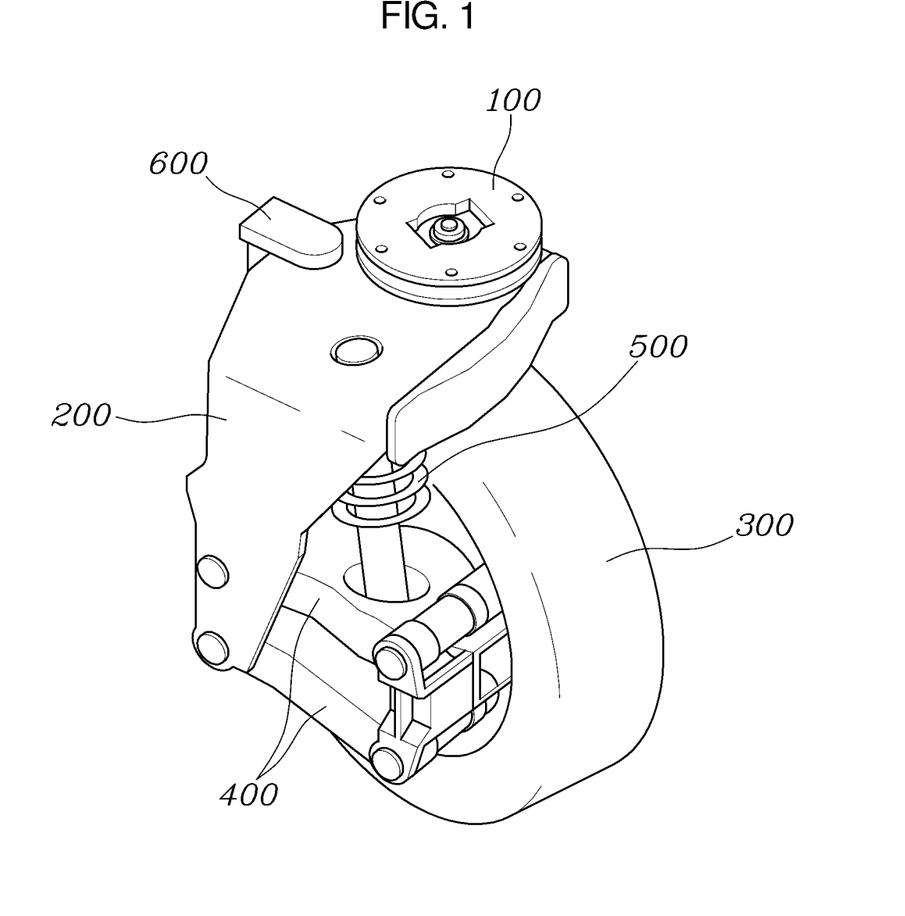
FIG. 1 is a perspective view showing an independently driving wheel module according to an embodiment of the present invention.
Figure 2:
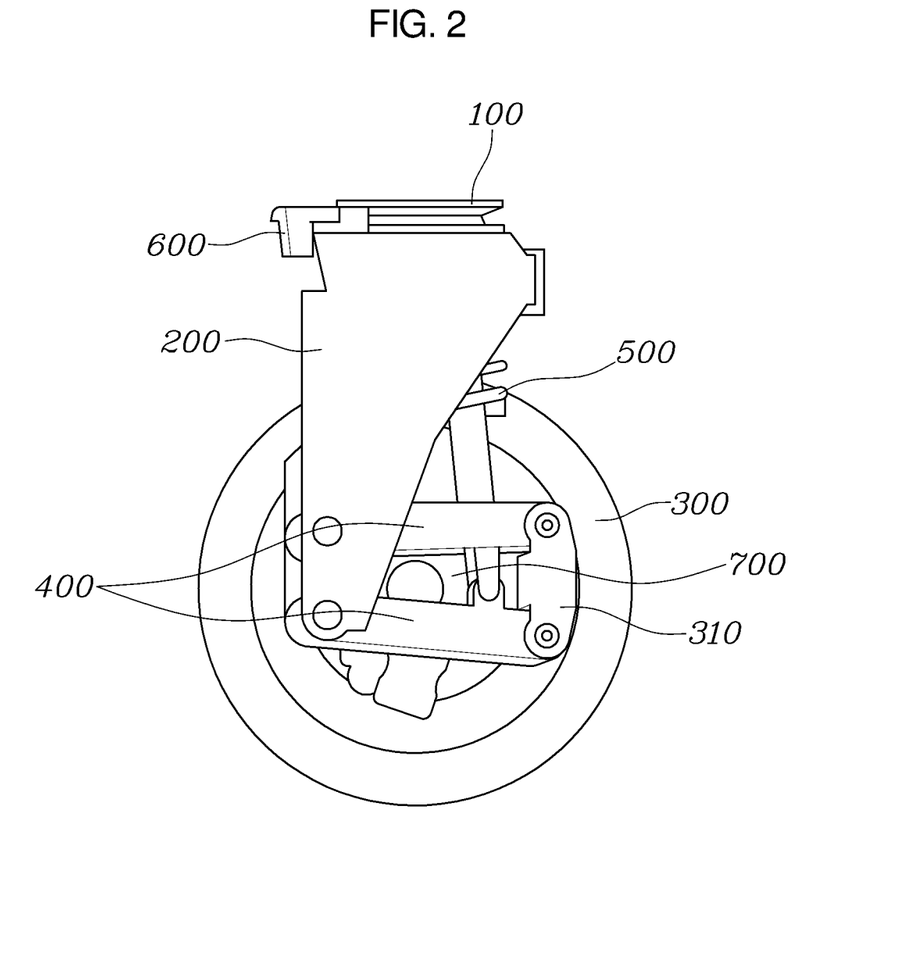
FIG. 2 is a front view showing the independently driving wheel module according to the embodiment of the present invention.
Figure 3:
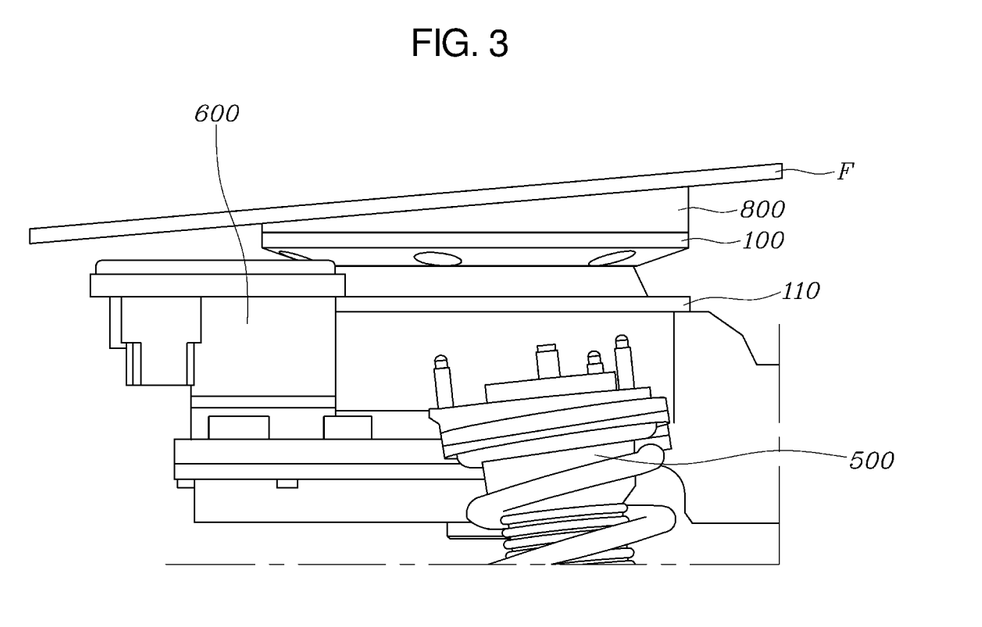
FIG. 3 is an enlarged view showing the independently driving wheel module according to the embodiment of the present invention.

FIG. 1 is a perspective view showing an independently driving wheel module according to an embodiment of the present invention. FIG. 2 is a front view showing the independently driving wheel module according to the embodiment of the present invention. FIG. 3 is an enlarged view showing the independently driving wheel module according to the embodiment of the present invention.

Referring to FIGS. 1 to 3, the independently driving wheel module according to the embodiment of the present invention includes: a base frame 100 having an upper end fixed to a coupling surface of a vehicle body F, and having a rotation part 110 coupled to the upper end to be relatively rotatable with respect to the upper end; a connection link 200 of which a first end is integrally coupled to the rotation part 110 of the base frame 100, and a second end has a shape extending downward from the first end thereof; a driving wheel 300 located at a side of the second end of the connection link 200 and coupled to the second end of the connection link 200; and a rotation plate 800 of which an upper surface and a lower surface extend obliquely in misaligned directions, the rotation plate 800 being interposed between the base frame 100 and the vehicle body F so as to be relatively rotatable with respect to the base frame 100 or the vehicle body F.

The vehicle body F may be a main body frame of a vehicle. As another embodiment, the vehicle body F may include all equipment that may be equipped with the driving wheel 300, such as robots, transport devices, etc.

The coupling surface of the vehicle body F may be located at a plurality of locations provided on the vehicle body F. Specifically, the coupling surfaces may be four coupling surfaces located on the front left and right of the vehicle body F and on the rear left and right of the vehicle body F. According to the embodiment of the present invention, the independently driving wheel module may be separately mounted each corner of the vehicle.

The base frame 100 is located below the coupling surface of the vehicle body F. The upper end of the base frame 100 may be securely fixed to the coupling surface of the vehicle body F. As an embodiment, the upper end of the base frame 100 may be bolted to the coupling surface of the vehicle body F.

The base frame 100 may include the rotation part 110 that is coupled to the upper end in a relatively rotatable manner. As the embodiment, the rotation part 110 may be rotatable on a shaft that extends in a vertical direction or a direction perpendicular to the coupling surface of the vehicle body F.

The rotation part 110 of the base frame 100 is relatively rotated on the upper end of the base frame 100 coupled to the coupling surface of the vehicle body F. Accordingly, the driving wheel 300 may be steered while being rotated on the vehicle body F.

The connection link 200 may connect the driving wheel 300 to the base frame 100. The first end of the connection link 200 is integrally coupled to the rotation part 110 of the base frame 100. As the rotation part 110 is rotated, the first end of the connection link 200 may also be rotated with the rotation part 110. The second end of the connection link 200 may extend downward so as to be located at a side of the driving wheel 300.

The driving wheel 300 is located at the side of the second end of the connection link 200 and may be coupled to the second end of the connection link 200. As described below, the driving wheel 300 includes a separate driving device 700. The driving device 700 may rotate the driving wheel 300 on the second end of the connection link 200.

The rotation plate 800 may include the upper and lower surfaces that extend obliquely in the misaligned directions. The upper surface of the rotation plate 800 may be in planar-contact with the coupling surface of the vehicle body F and the lower surface thereof may be in planar-contact with the upper surface of the base frame 100.

The rotation plate 800 may be interposed between the base frame 100 and the vehicle body F and may be coupled to the base frame 100 or the vehicle body F in the relatively rotatable manner. Therefore, as the rotation plate 800 having the upper and lower surfaces that are obliquely biased from each other is relatively rotated on the base frame 100 or the vehicle body F, an angle at which the base frame 100 is coupled to the vehicle body F may vary.

With the structure of the rotation plate 800, while the independently driving wheel module is primarily assembled to the vehicle body F, a camber angle and a caster angle may be adjusted.

Therefore, an angle at which the base frame 100 is coupled to the vehicle body F may be adjusted by rotating the rotation plate 800 that has the upper and lower surfaces extending obliquely between the base frame 100 and the vehicle body F.

The rotation plate 800 is located between the base frame 100 and the vehicle body F and is coupled to the base frame 100 or the vehicle body F in the relatively rotatable manner. While the rotation plate 800 is coupled to the base frame 100 or the vehicle body F in the relatively rotatable manner, the rotation plate 800 may be securely coupled to the base frame 100 to the vehicle body F.

In detail, the rotation plate 800 is interposed between the base frame 100 and the vehicle body F, and is primarily coupled to the base frame 100 or the vehicle body F in the relatively rotatable manner. After angle adjustment is completed by rotation of the rotation plate 800, the rotation plate 800 may be securely coupled to the base frame 100 or the vehicle body F while being in coupled state in the relatively rotatable manner.

Figure 4:
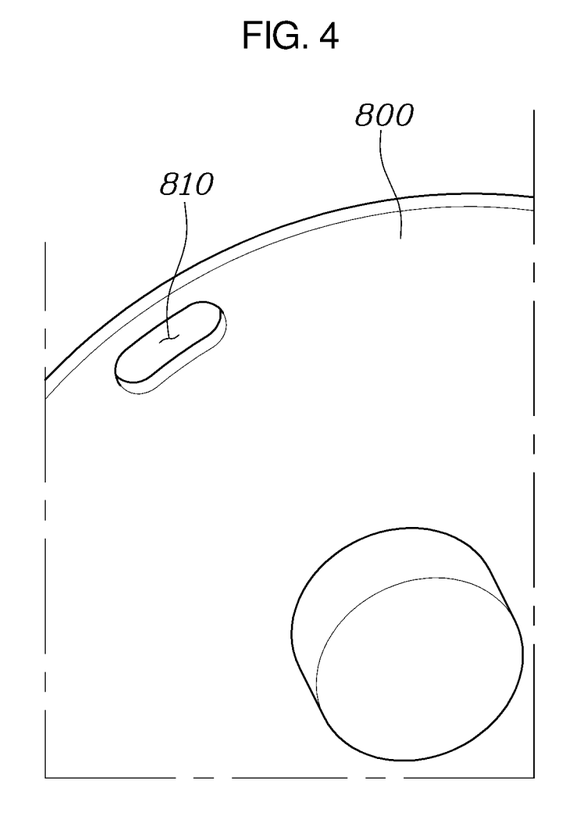
FIG. 4 is an enlarged view showing a rotation plate according to the embodiment of the present invention.
Figure 5:
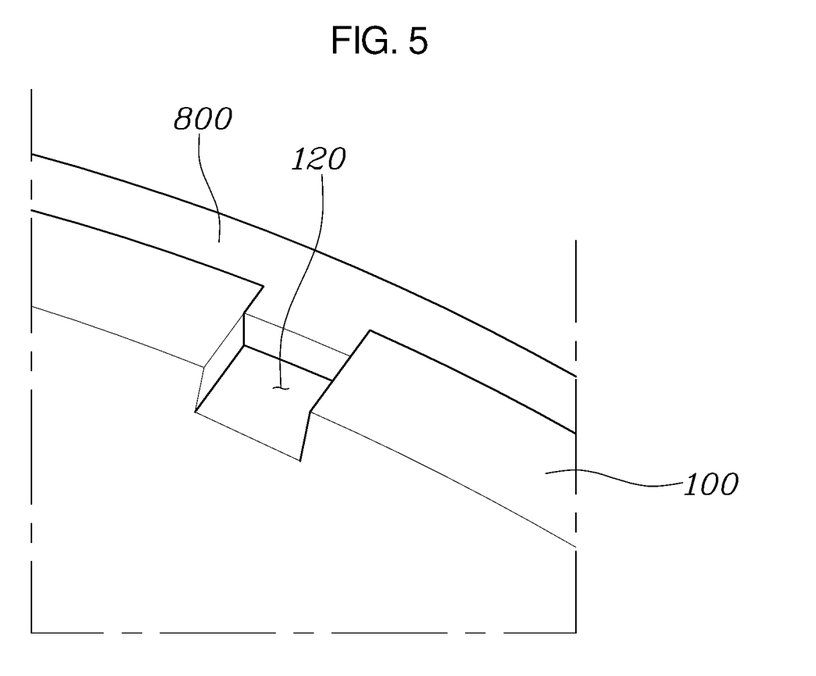
FIG. 5 is an enlarged view showing the rotation plate and a base frame in a coupled state according to the embodiment of the present invention.

FIG. 4 is an enlarged view showing the rotation plate 800 according to the embodiment of the present invention. FIG. 5 is an enlarged view showing the rotation plate 800 and the base frame 100 in a coupled state according to the embodiment of the present invention.

Referring to FIGS. 4 and 5, the rotation plate 800 has a long hole 810 extending along a path that is relatively rotated with respect to the base frame 100. The rotation plate 800 may be coupled to the base frame 100 or the vehicle body F in the relatively rotatable manner via the long hole 810.

As the embodiment, the base frame 100 is bolted to the vehicle body F by a bolt extending in a longitudinal direction thereof, and the bolt may extend to penetrate the rotation plate 800 interposed between the base frame 100 and the vehicle body F. Specifically, the bolt may be coupled to the base frame 100 and the vehicle body F while passing through the long hole 810 of the rotation plate 800. The rotation plate 800 may be relatively rotatable with respect to the base frame 100 or the vehicle body F along the long hole 810.

In addition, the base frame 100 has a coupling groove 120 that is depressed downward or inward. The rotation plate 800 may be fixed by being locked and coupled to the coupling groove 120 while being rotatably coupled to the base frame 100.

The base frame 100 has the coupling groove 120 that penetrates the based frame or is depressed thereon. The rotation plate 800 may be fixed while being locked and coupled to the coupling groove 120.

As an embodiment, the base frame 100 has the coupling groove 120 that is depressed inward of the base frame or depressed downward from the upper surface thereof in contact with the rotation plate 800. As the rotation plate 800 is projected inward of the coupling groove 120 by plastic deformation (caulking, etc.), the rotation plate 800 may be locked and coupled to the coupling groove 120.

While the rotation plate 800 is primarily coupled to the base frame 100 or the vehicle body F to be rotatable, the rotation plate 800 may be finally coupled to the base frame 100 or the vehicle body F so as to prevent relative rotation as the rotation plate 800 is plastically deformed to be projected toward the coupling groove 120 of the base frame 100.

As an embodiment, the rotation plate 800 may be formed of a metal material such as aluminum, and the upper and lower surfaces of the rotation plate 800 may be processed in a knurling manner. Accordingly, when the rotation plate 800 is finally coupled to the base frame 100 and the vehicle body F, relative rotation therebetween can be prevented.

The upper surface of the rotation plate 800 extends parallel to the coupling surface of the vehicle body F and the lower surface thereof extends parallel to the upper surface of the base frame 100. The coupling surface of the vehicle body F and the upper surface of the base frame 100 may be inclined obliquely.

Specifically, the upper surface and the lower surface of the rotation plate 800 may extend in diagonal directions from each other instead of being parallel to each other. The upper surface of the rotation plate 800 may extend parallel to the coupling surface of the vehicle body F to be in planar-contact therewith. The lower surface of the rotation plate 800 may extend parallel to the upper surface of the base frame 100 to be in planar contact therewith.

Accordingly, the upper surface of the base frame 100 diagonally extends in a non-parallel direction to the coupling surface of the vehicle body F, whereby the camber angle or the caster angle of the driving wheel 300 may be generated.

Figure 6:
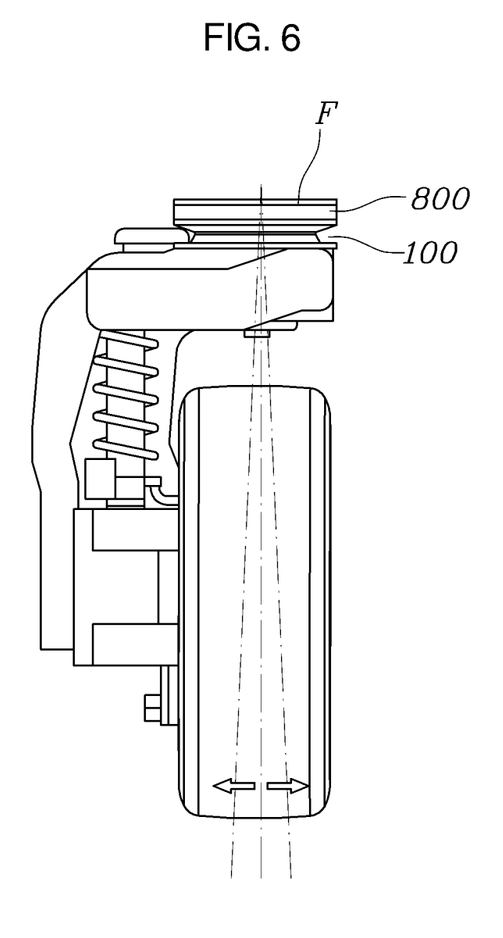
FIGS. 6 to 7 are views respectively showing a camber angle and a caster angle of the driving wheel according to the embodiment of the present invention.
Figure 7:
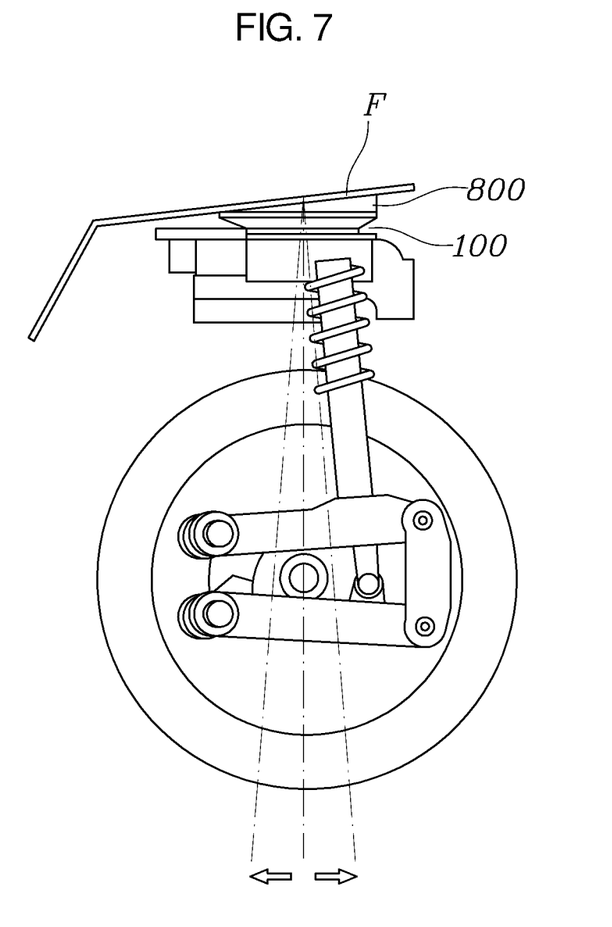

FIGS. 6 to 7 are views respectively showing the camber angle and the caster angle of the driving wheel 300 according to the embodiment of the present invention.

Referring to FIGS. 6 and 7, the rotation plate 800 may change the camber angle or the caster angle of the driving wheel 300 by being relatively rotated with respect to the base frame 100 or the vehicle body F.

As an embodiment, as the rotation plate 800 with the upper and lower surfaces that extend in the diagonal directions from each other is relatively rotated with respect to the base frame 100 or the vehicle body F, the angle at which the base frame 100 is coupled to the coupling surface of the vehicle body F may be adjusted. Therefore, the camber angle and the caster angle of the driving wheel 300 coupled to the base frame 100 may vary at the same time.

The driving wheel 300 may include a knuckle 310 coupled to the second end of the connection link 200 and a hub rotatably coupled to the knuckle 310. The independently driving wheel module may include: the driving device 700 fixed to the knuckle 310 and rotating the hub on the knuckle 310 when the driving device is operated.

The knuckle 310 is coupled to the second end of the connection link 200, and as described below, the knuckle 310 may be rotatably coupled to the second end of the connection link 200. The hub may be rotatably coupled to the knuckle 310, and the hub may be rotated in a grounded state with the ground through a tire or the like.

The driving device 700 may be an in-wheel motor, and may be securely coupled to the knuckle 310 to apply a rotation force to the hub when the driving device is operated.

The driving wheel 300 includes the knuckle 310 coupled to the second end of the connection link 200 and the hub rotatably coupled to the knuckle 310. The knuckle 310 may be coupled to the second end of the connection link 200 so as to allow relative movement in a vertical direction with respect to the second end of the connection link 200.

The knuckle 310 may be rotatably coupled to the second end of the connection link 200. As the knuckle 310 is rotatably coupled to the second end of the connection link 200, the knuckle 310 may be relatively moved upward and downward with respect to the second end of the connection link 200.

More specifically, the independently driving wheel module may include: a plurality of coupling links 400 that are disposed to be vertically spaced apart from each other, of which each first end is rotatably coupled to the second end of the connection link 200, and of which each second end is rotatably coupled to the knuckle 310.

The plurality of coupling links 400 extends in a longitudinal direction according to a forward direction in which the driving wheel 300 travels by rotation thereof, and may be disposed to be spaced apart from each other in a vertical direction. Furthermore, the plurality of coupling links 400 is rotatably coupled to, at a first end thereof, to the second end of the connection link 200 while being spaced apart from each other, and the second end of the plurality of the coupling links may be rotatably coupled to the knuckle 310.

The connection link 200 and the knuckle 310 may provide a 4-bar linkage structure due to the plurality of coupling links 400, whereby the knuckle 310 may be moved upward and downward with respect to the second end of the connection link 200.

The independently driving wheel module may include: a suspension device 500 of which a first end is coupled to the connection link 200 and a second end is connected to the driving wheel 300, the suspension device 500 absorbing vertical vibration of the driving wheel 300.

The suspension device 500 may be a shock absorber. The first end of the suspension device 500 may be securely coupled to the connection link 200 and the second end thereof may be rotatably coupled to the knuckle 310 or the plurality of coupling links 400.

As an embodiment, the second end of the suspension device 500 may penetrate an upper coupling link 400 of the plurality of coupling links 400 and be rotatably coupled to a lower coupling link 400 thereof.

The independently driving wheel module may include: a steering device 600 of which a first end is securely coupled to the upper end of the base frame 100, the steering device 600 configured to rotate the rotation part 110 or the connection link 200 with respect to the first end thereof.

The steering device 600 may be a separate motor as the driving device 700. The steering device 600 may rotate the rotation part 110 or the connection link 200 with respect to the upper end of the base frame 100 securely coupled to the vehicle body F. The steering device 600 is integrally coupled to the rotation part 110 or the connection link 200. The steering device 600 may be rotated on the first end thereof fixed to the vehicle body F.

Specifically, the first end of the steering device 600 is connected to the upper end of the base frame 100 with a gear, thereby increasing steering torque.

Figure 8:
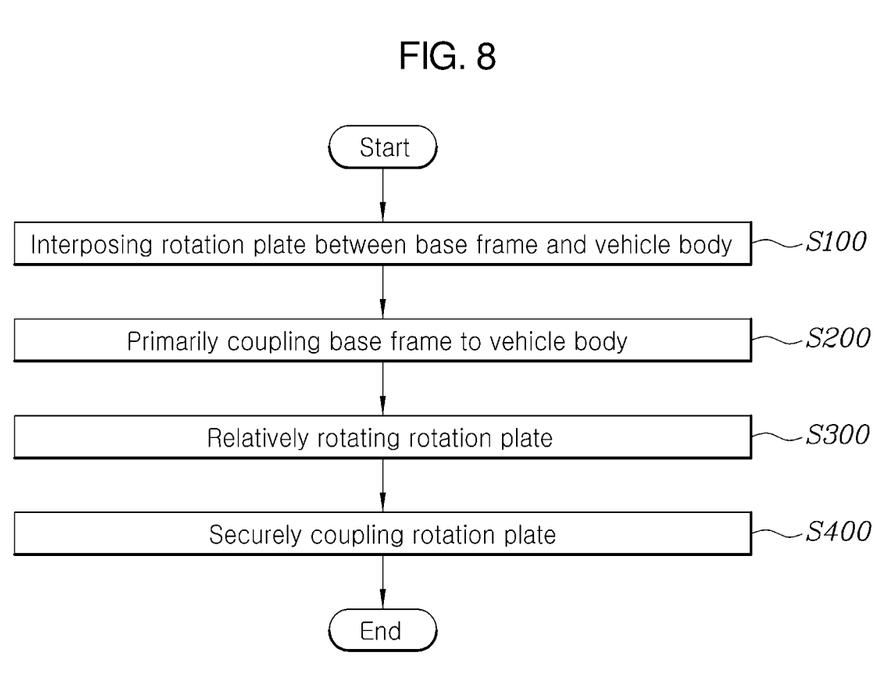
FIG. 8 is a flowchart showing a mounting method of the independently driving wheel module according to an embodiment of the present invention.

FIG. 8 is a flowchart showing a mounting method of the independently driving wheel module according to an embodiment of the present invention.

Referring to FIG. 8, as a method of mounting the independently driving wheel module, the mounting method of the independently driving wheel module according to an embodiment of the present invention includes: interposing the rotation plate 800 between the base frame 100 and the vehicle body F in the relative rotatable manner with respect to the base frame 100 or the vehicle body F at S100; relatively rotating the rotation plate 800 with respect to the base frame 100 or the vehicle body F at S300; and securely coupling the rotation plate 800 to the base frame 100 or the vehicle body F at S400.

After the interposing the rotation plate 800 at S100, the mounting method may include: primarily coupling the base frame 100 to the vehicle body F at S200 so as to prevent relative rotation.

In the relatively rotating the rotation plate 800 at S300, the rotation plate 800 obliquely inclined may be relatively rotated with respect to the base frame 100 or the vehicle body F so as to change the camber angle or the caster angle of the driving wheel 300.

In the securely coupling the rotation plate 800 at S400, the rotation plate 800 may be securely coupled to the base frame 100 or the vehicle body F by being plastically deformed.

Although the preferred embodiments of the present invention have been disclosed for illustrative purposes, those skilled in the art will appreciate that various modifications, additions and substitutions are possible, without departing from the spirit and scope of the present invention.

What is claimed is:

1. An independently driving wheel module, comprising:
   a base frame disposed at a lower surface of a vehicle body;
   a rotation part configured to be rotatable with respect to the base frame;
   a connection link including a first end integrally coupled to the rotation part, and a second end having a shape extending downward from the first end of the connection link;
   a driving wheel disposed at a side of the second end of the connection link and coupled to the second end of the connection link; and
   a rotation plate including an upper surface and a lower surface extending obliquely in misaligned directions, the rotation plate varies a camber angle or a caser angle of a drive wheel by being relatively rotated in a state interposed between the base frame and the vehicle body,
   wherein the lower surface of the rotation plate is coupled to a surface of the base frame.

2. The independently driving wheel module of claim 1, wherein the base frame includes an upper end fixed to a coupling surface of the vehicle body, and the rotation part is coupled to a lower surface of an upper end of the base frame such that the rotation part is rotatable with respect to the upper end of the base frame.

3. The independently driving wheel module of claim 1, wherein the rotation plate is securely coupled to the base frame or the vehicle body such that the rotation plate is rotatable with respect to the base frame or the vehicle body.

4. The independently driving wheel module of claim 3, wherein the rotation plate further includes an elongated hole extending along a path in which the rotation plate is rotatable with respect to the base frame, and
   wherein the rotation plate is coupled to the base frame or the vehicle body via the elongated hole.

5. The independently driving wheel module of claim 3, wherein the base frame further includes a coupling groove that is depressed downward or inward in the base frame, and
   wherein the rotation plate is fixed by being locked and coupled to the coupling groove while being rotatably coupled to the base frame.

6. The independently driving wheel module of claim 1, wherein the upper surface of the rotation plate extends parallel to the coupling surface of the vehicle body and the lower surface of the rotation plate extends parallel to an upper surface of the base frame, and
   wherein the coupling surface of the vehicle body and the upper surface of the base frame are inclined obliquely to each other.

7. The independently driving wheel module of claim 1, wherein the driving wheel comprises a knuckle coupled to the second end of the connection link and a hub rotatably coupled to the knuckle, and
   wherein the independently driving wheel module further comprises a driving device fixed to the knuckle and operable to rotate the hub on the knuckle.

8. The independently driving wheel module of claim 1, wherein the driving wheel comprises a knuckle coupled to the second end of the connection link and a hub rotatably coupled to the knuckle, and
   wherein the knuckle is coupled to the second end of the connection link so as to allow relative movement of the knuckle in a vertical direction with respect to the connection link.

9. The independently driving wheel module of claim 8, further comprising:
   coupling links disposed to be vertically spaced apart from each other, the coupling links including respective first ends rotatably coupled to the second end of the connection link, and respective second ends rotatably coupled to the knuckle.

10. The independently driving wheel module of claim 1, further comprising:
    a suspension device including a first end coupled to the connection link and a second end connected to the driving wheel, the suspension device being configured to absorb vertical vibration of the driving wheel.

11. The independently driving wheel module of claim 1, further comprising:
    a steering device including a first end securely coupled to the upper end of the base frame, the steering device being configured to rotate the rotation part or the connection link on the first end of the steering device as a center of rotation.

12. A method of mounting an independently driving wheel module, the method comprising:
    interposing a rotation plate between a base frame and a vehicle body and fixing an upper end of the base frame to a coupling surface of the vehicle body, such that the rotation plate is rotatable with respect to the base frame or the vehicle body;
    rotating the rotation plate with respect to the base frame or the vehicle body; and
    securely coupling the rotation plate to the base frame or the vehicle body,
    wherein the base frame is disposed at a lower surface of a vehicle module, wherein the rotation plate includes an upper surface and a lower surface extending obliquely in misaligned directions, and
    wherein the independently driving wheel module comprises:
    the rotation plate;
    the base frame;
    a rotation part configured to be rotatable with respect to the base frame;
    a connection link including a first end integrally coupled to the rotation part, and a second end having a shape extending downward from the first end of the connection link; and
    a driving wheel disposed at a side of the second end of the connection link and coupled to the second end of the connection link,
    wherein, in the rotating of the rotation plate, the rotation plate is rotated with respect to the base frame or the vehicle body so as to change a camber angle or a caster angle of the driving wheel, and
    wherein the lower surface of the rotation plate is coupled to a surface of the base frame.

13. The method of claim 12, wherein the rotation part is coupled to a lower surface of an upper end of the base frame such that the rotation part is rotatable with respect to the upper end of the base frame.

14. The method of claim 12, further comprising:
after the rotation plate is interposed between the base frame and the vehicle body, primarily coupling the base frame to the vehicle body so as to prevent rotation of the base frame with respect to the vehicle body.

15. The method of claim 12, wherein the securely coupling of the rotation plate comprises securely coupling the rotation plate to the base frame or the vehicle body by plastically deforming the rotation plate.

* * * * *